INVENTOR
John K. Nemeth
BY Wayne B. Easton

INVENTOR.
John K. Nemeth
BY Wayne B. Easton

Jan. 29, 1963 J. K. NEMETH 3,075,605
AUTOMOBILE FRONT SHEET METAL UNIT MOUNTING ARRANGEMENT
Filed June 22, 1960 5 Sheets-Sheet 4

INVENTOR.
John K. Nemeth
BY
Wayne B. Easton

Jan. 29, 1963 J. K. NEMETH 3,075,605
AUTOMOBILE FRONT SHEET METAL UNIT MOUNTING ARRANGEMENT
Filed June 22, 1960 5 Sheets-Sheet 5

INVENTOR.
BY John K. Nemeth
Wayne B. Easton

United States Patent Office 3,075,605
Patented Jan. 29, 1963

3,075,605
AUTOMOBILE FRONT SHEET METAL UNIT
MOUNTING ARRANGEMENT
John K. Nemeth, South Bend, Ind., assignor to Studebaker-Packard Corporation, South Bend, Ind., a corporation of Michigan
Filed June 22, 1960, Ser. No. 37,962
13 Claims. (Cl. 180—89)

This invention relates to a mounting arrangement for the front sheet metal unit of an automobile.

In the construction of an automobile there are three main parts thereof which are of interest in connection with the present invention. These are the frame member, the body member and the front sheet metal unit.

The frame member extends longitudinally of the vehicle for substantially the entire length thereof. It is normally characterized by having two generally parallel longitudinally extending rail members each of which may have a U or box shaped section.

The body member is attached to the frame member and may take various shapes or forms. The front portion of the body beneath the windshield is referred to generally as a cowl and in the type of automobile to which the invention is applicable the cowl extends transversely across the frame unit and is positioned longitudinally between the ends of the frame unit.

The front sheet metal unit comprises, essentially, the two front fenders and transverse structural means connecting the front ends of the fenders. The front sheet metal unit is fabricated as a unit and the rear of this unit, that is, the rear of the front fenders, is attached to the cowl member as by bolting. The front end of the front sheet metal unit is attachable to the front end of the frame but the attachment between the sheet metal unit and the cowl is or can be sufficient to support the sheet metal unit in a horizontal position like a cantilever.

In a prior art type of vehicle the "supported structure" thereof, which consists of the frame, body and front sheet metal unit, has a longitudinal axis of rotation about which there is torsional vibration. The vibrational movement of the wheels of the vehicle imparts forces to the frame which cause the longitudinally extending rails of the frame to pivot about a transverse axis in opposite phase relationship to each other. Due to the flexibility of sheet metal, the opposite sides of the body and the front sheet metal unit follow the vibrational movements of the frame rails and the "supported structure," consisting of the frame body and front sheet metal unit, is thus subjected to torsional vibration as a mass or unit about a longitudinal axis of rotation as mentioned above.

It often happens in practice that the natural frequency of the "supported structure" is sufficiently close to the natural frequency of the front wheel suspension such that a resonant condition is present. This is objectionable because it is a cause of poor riding conditions.

By way of example, a prior art type vehicle may have the "supported structure" thereof and the front wheel suspension thereof each having a natural frequency of 12 to 13 cycles per second and this would represent an objectionable resonant condition.

In the present invention the front of the front sheet metal unit is attached to the front of the frame with a mounting which is located at a point through which the above mentioned axis of rotation extends. With this arrangement the front sheet metal unit is allowed to vibrate torsionally about the axis of rotation at its natural frequency substantially independently of the vibrations of the frame and the vibrations of the front wheel suspension. In a particular installation embodying the invention, for example, the front wheel suspension 31 of the vehicle had a natural frequency of 12 to 13 cycles per second and the front sheet metal unit was given a natural frequency of 9 to 10 cycles per second. Although it was not measured, it is known that the natural frequency of the frame increased considerably, possibly to 15 to 16 cycles per second.

With the new mounting arrangement for the front sheet metal unit described above, there are no near resonant conditions between the front sheet metal unit, the frame and the front wheel suspension.

The mounting arrangement permits torsional vibration of the front sheet metal unit about its axis of rotation but restricts other degrees of freedom. In a vehicle in which the invention was utilized the amplitude of torsional vibration of the front sheet metal unit at its sides was about one eighth of an inch.

A main object of the invention is to provide a new and improved mounting arrangement for connecting the front sheet metal unit of a vehicle to the vehicle.

Another object is to connect the sheet metal unit in a manner so that it has torsional vibration about its longitudinal axis of rotation relative to the frame, the body, and the front wheel suspension.

Other objects of the invention will become apparent from the following specification, the drawings relating thereto, and the appended claims.

Figure 1:
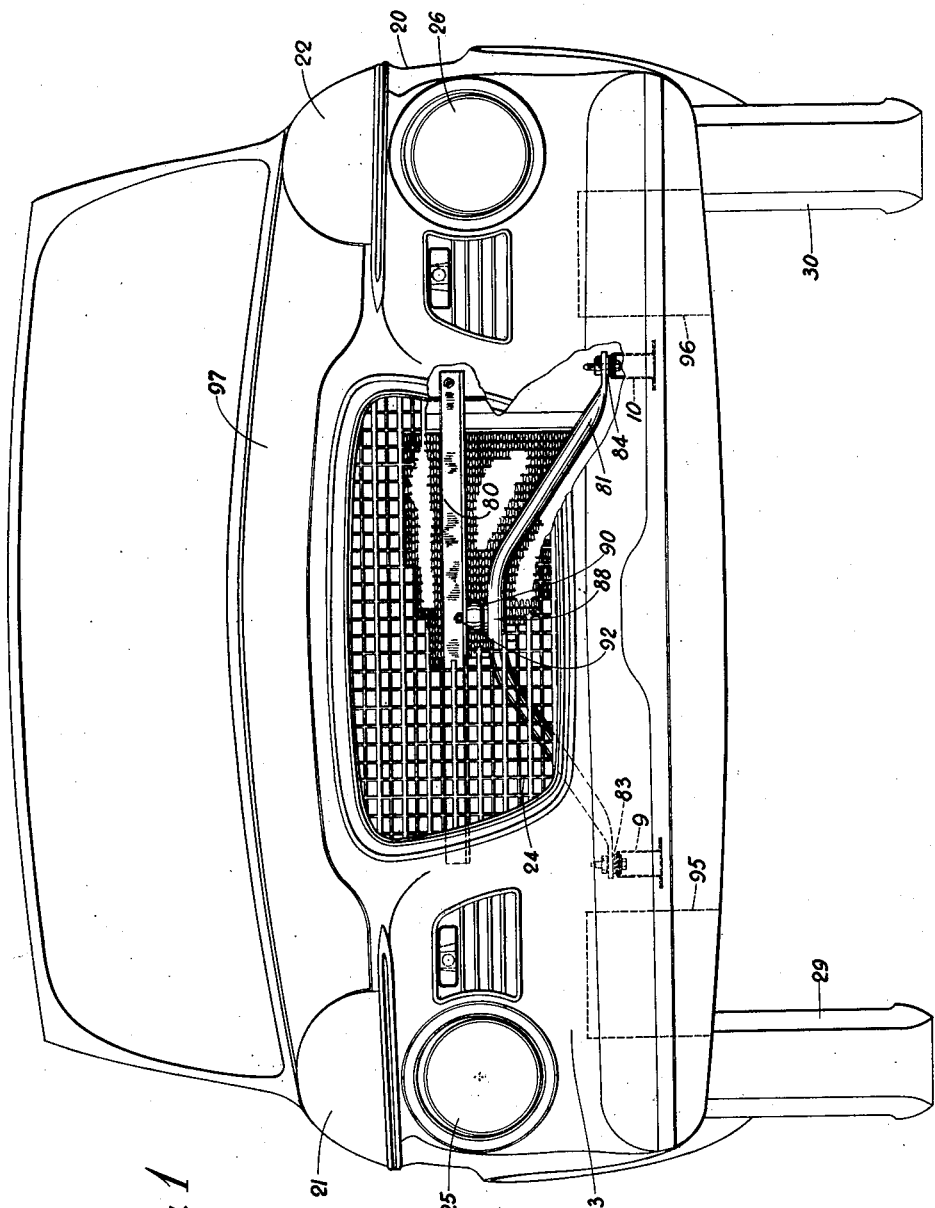
FIG. 1 is a front view of an automobile having a portion of the grille and front sheet metal broken away to show the mounting arrangement in accordance with the present invention for connecting the front sheet metal unit to the frame.
Figure 2:
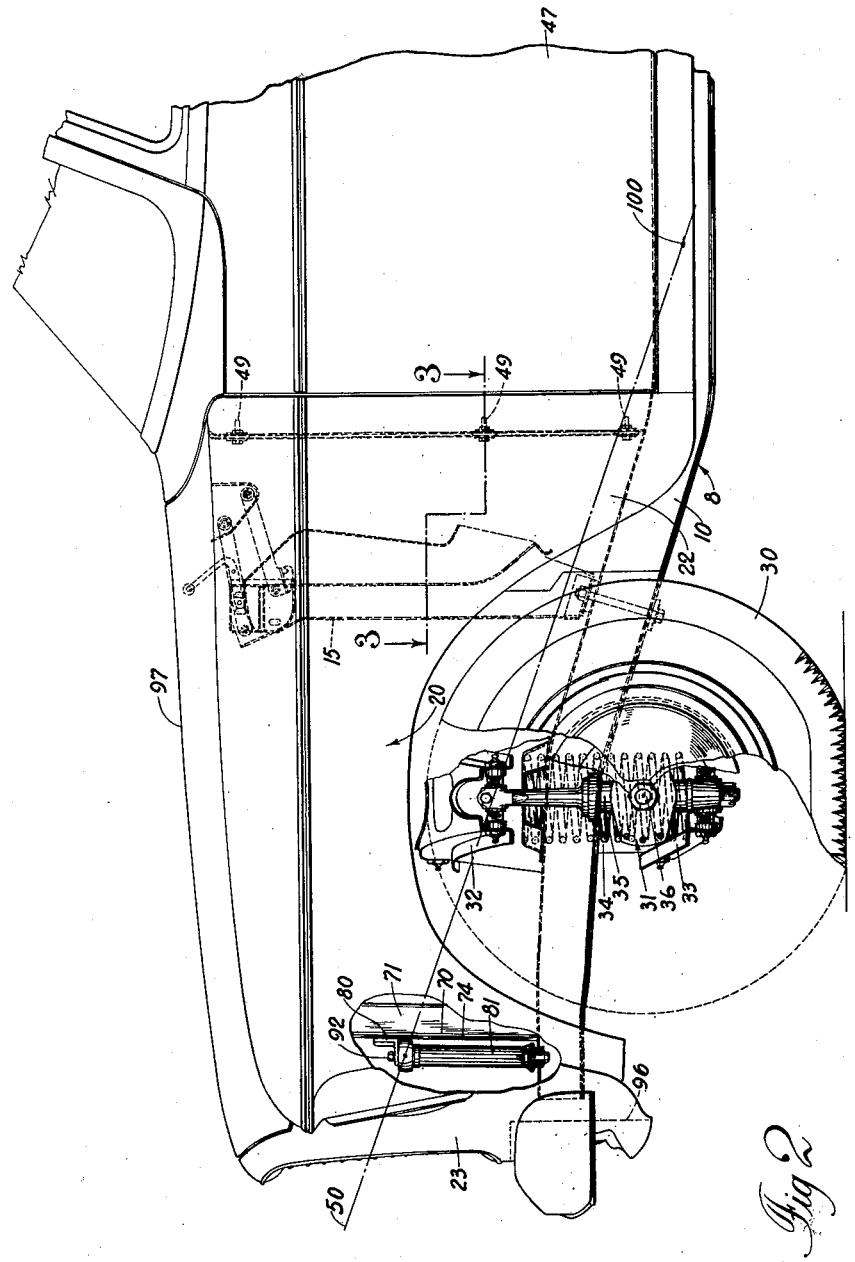
FIG. 2 is a side view of the front part of the automobile with a portion of the fender broken away to show the side view of the mounting arrangement for connecting the front of the front sheet metal unit to the front of the frame and the rear of the unit to the cowl.

FIGS. 1 and 2 of the drawings show the front end of an automobile embodying the invention. Of importance with respect to the invention is the frame member 8 which is shown as having two rails 9 and 10, each with a box or U-shaped section, which are generally parallel to each other and extend longitudinally with respect to the length of the vehicle.

Figure 4:
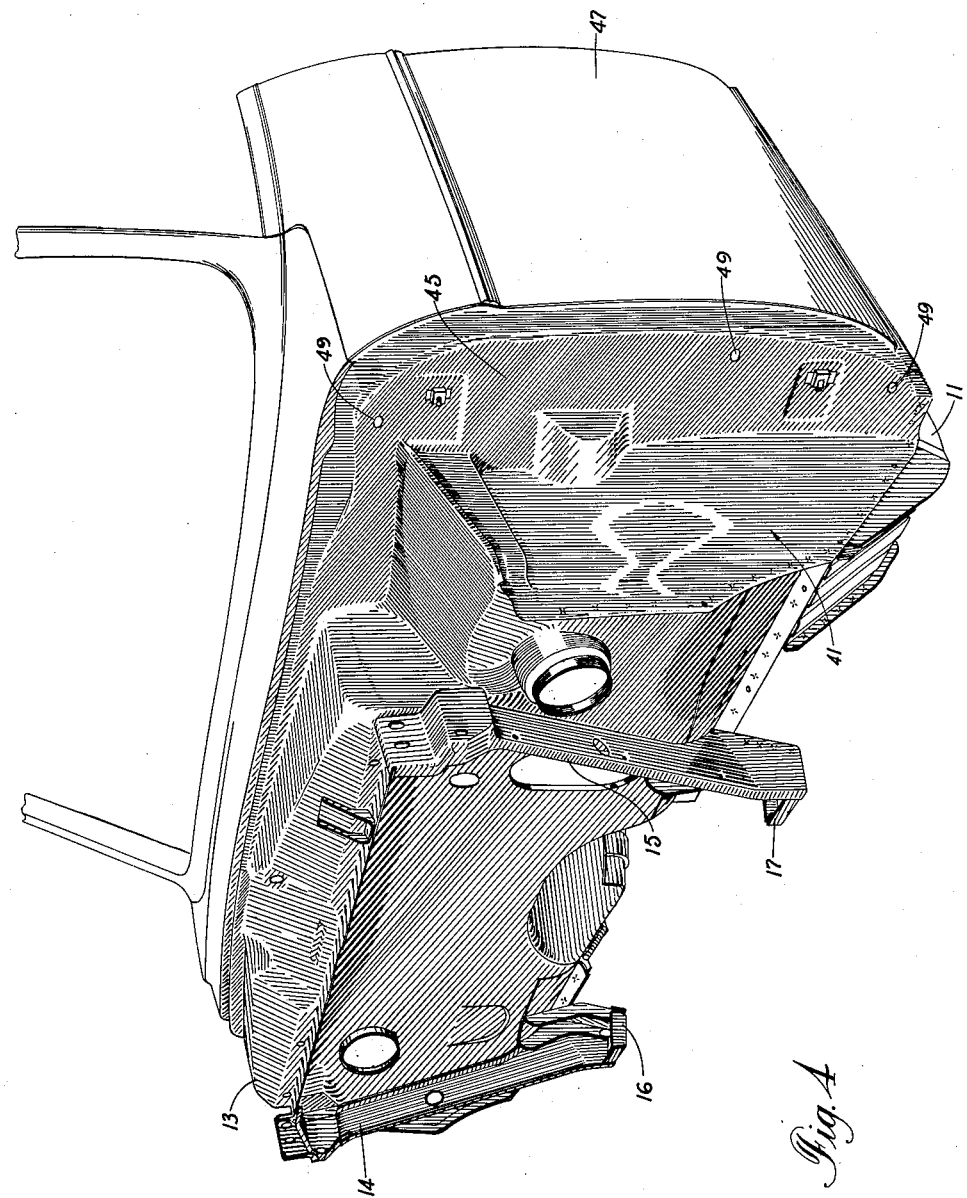
FIG. 4 is a perspective view showing the cowl to which the front sheet metal unit is attached.

The body 11, the front portion of which is also shown in FIG. 4, is attached rigidly to the frame in a conventional manner. The front portion of the body 11 is the cowl 13 and, as far as the invention is concerned, the main part of the cowl is best shown by the shaded portion in FIG. 4. Upright structural members 14 and 15, each having a channel shaped section, are welded to and may be considered a part of the cowl 13. Members 14 and 15 have feet portions 16 and 17 which are attached respectively to frame rails 9 and 10, as by bolting, for attaching the front part of body 11 rigidly to the frame 8.

A front sheet metal unit 20 has as main parts thereof two front fenders 21 and 22 and a transversely extending sheet metal member 23 which joins and connects the front ends of the fenders 21 and 22. Transverse member 23 is formed to receive a grille 24 and headlights 25 and 26. The front sheet metal unit 20 may have other elements as a part thereof or mounted thereon such as the radiator 27 and elements not shown such as a battery, a horn and other miscellaneous elements usually found in an engine compartment.

The sides of the engine compartment of the car are formed by two pieces of sheet metal called aprons which may be considered inner portions of the fenders and parts of the entire unit which is referred to herein as the front sheet metal unit 20. Only one of the aprons is shown in the drawings and that is apron 28 shown in FIGS. 3 and 5. The aprons are usually joined to the fenders as by spot welding.

The front suspension for the vehicle, which is disposed between frame 8 and wheels 29 and 30, may be of any type and a conventional suspension 31 is illustrated. Suspension 31 is shown in FIG. 2 and comprises upper and lower lever arms 32 and 33 pivotally connected to frame 8, a coil spring 34 between lower lever arm 33 and the frame 8, king pin 35 between the outer ends of lever arms 32 and 33, and wheel spindle or axle 36 connected to king pin 35.

Figure 3:
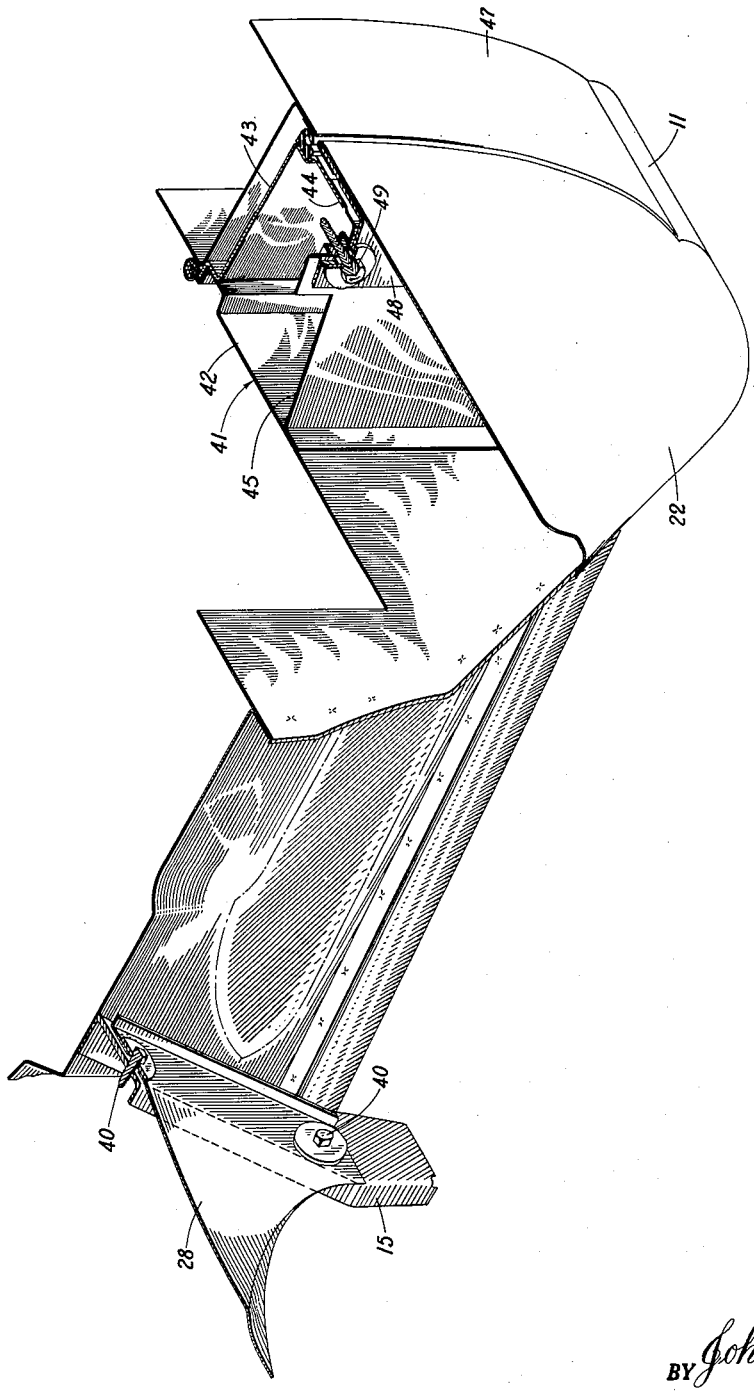
FIG. 3 is a fragmentary isometric sectional view taken on line III—III of FIG. 2 and shows how the fender portion of the front sheet metal unit is connected to the cowl.

In the assembly operations for the automobile the front sheet metal unit 20 is preassembled and mounted as a unit. The rear end of unit 20 is attached to cowl 13 in a conventional manner and this can be best seen in FIG. 3. The apron portions of the fenders are attached to the cowl, apron 28 being shown attached to cowl member 15 with bolt means 40. The rear portions of the fenders 21 and 22 are connected to the door pillar portions of the cowl 13. One of the door pillars, pillar 41, is illustrated in FIG. 3 and it is in the form of a vertical column having sides 42, 43, 44 and 45. A door 47 is hinged to the rearward side 43 of the pillar. The rear end of fender 22 is folded back and flange 48 thereof is formed to permit fastening of the fender 22 to the frontward side 45 of the door pillar 41 as with bolt or fastening means 49 as shown in FIGS. 2 and 3.

With the front sheet metal unit 20 attached to the cowl 13 as described, the rigidity of unit 20 is such that unit 20 is supported by cowl 13 in the same manner as a cantilever beam would be supported if there were no connection between the front portion of the front sheet metal unit 20 and the front portion of the frame 8. In the absence of such a connection, the front sheet metal unit 20 would vibrate torsionally about a line referred to in the introduction hereof as the axis of rotation of the sheet metal unit 20. This is the axis of rotation 50 which is shown in FIG. 2. The axis of rotation 50 will be explained in detail farther on and at this point it is sufficient to state that this axis extends generally longitudinally midway between the rails 8 and 9 of the frame 8 and slopes downwardly towards the rear of the vehicle.

Figure 5:
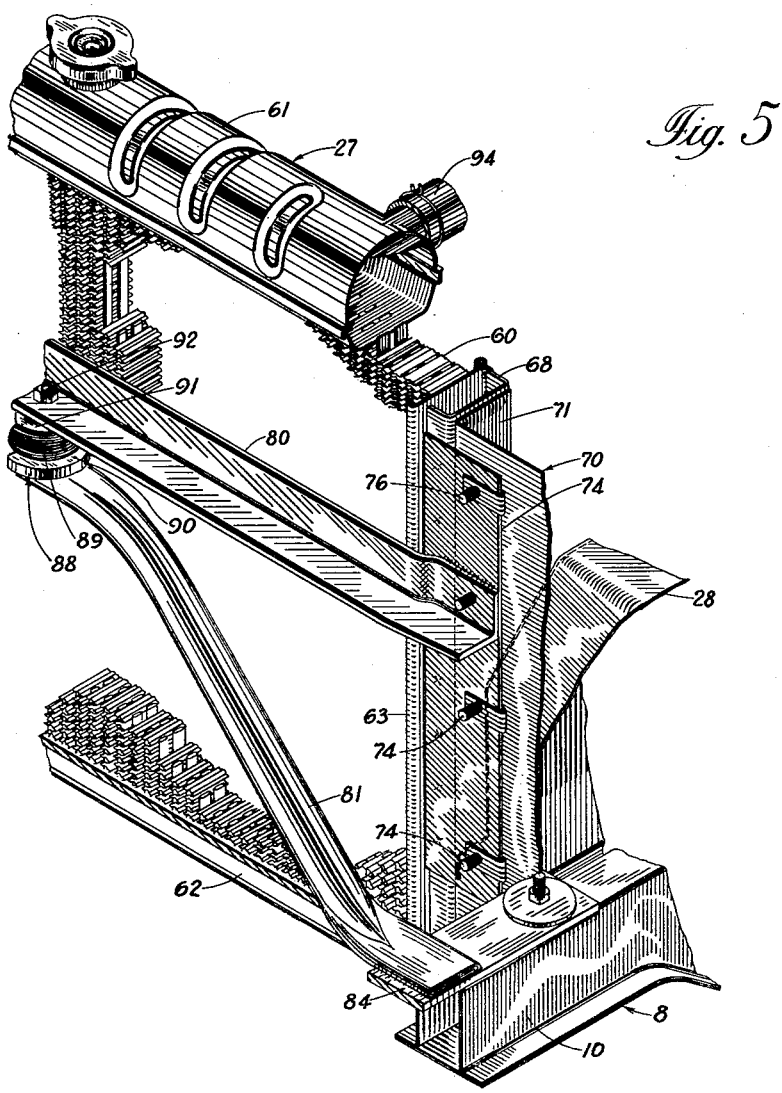
FIG. 5 is a fragmentary isometric view which shows the manner in which the front part of the front sheet metal unit is connected to the front part of the vehicle frame.

The front end of the front sheet metal unit 20 is attached to the frame 8 as illustrated in FIGS. 1 and 2 and particularly FIG. 5. Radiator 27 comprises several parts including a radiator core 60, two radiator tank portions 61 and 62 above and below the core respectively, and two vertically extending struts 63 (only one of which is shown in FIG. 5) to which the ends of tank portions 61 and 62 are attached. In effect tank portions 61 and 62 and struts 63 form a rigid frame for the radiator 27.

A core support member 68 is illustrated as having a channel shaped cross section and is fixedly attached to struts 63. Viewed from the front of the vehicle, core support member 68 is generally U-shaped with the radiator 27 being disposed between the two vertically extending sides thereof. Although only one vertically extending side of U-shaped core support member 68 is illustrated in the drawing (see FIG. 5), it will be understood that the core support member functions as a bracket or frame for radiator 27 to facilitate the attaching of the radiator to the front sheet metal unit 20 as will be explained.

It may be mentioned at this point with respect to FIGS. 3 and 5 that the structure shown in these figures is symmetrical relative to the longitudinal centerline of the vehicle and it is only for convenience that only the structure on one side of the vehicle is illustrated.

In FIG. 5 it will be noted that the front portion of apron 28, which is a part of the front sheet metal unit 20, terminates adjacent core support member 68. Two vertically extending sheet metal projecting members are provided although only the left side one, member 70, is illustrated. The two projecting members, including member 70, are a part of the front sheet metal unit 20 and are securely connected to inside surfaces of the front portions of fenders 21 and 22 although these connections are not shown. Projecting member 70 has a flange portion 71 which is in spaced relation to the vertically extending leg of core support member 68.

Two plate members, the left one 74 of which is illustrated, are provided for connecting and tying together parts which comprise the front part of the front sheet metal unit 20 which are the front parts of the fender aprons, the front parts of the fenders, the projecting members and the core support member. On the left side of the car these members are the fender 22, apron 28, projecting member 70, core support member 68 and plate member 74. The connecting and tying together of these members is done by welding and by fastening means 76.

The structure described above is connected to rails 9 and 10 of the frame 8 by means of a cross bar 80 and a rocker bar 81. Cross bar 80 has a right angle section and is positioned horizontally between and attached to the two plate members although only plate member 74 is shown. Rocker bar 81 has an inverted V-shape as viewed from the front of the vehicle and the two legs of the V are rigidly fastened respectively to the frame rails 9 and 10. Rocker bar 81 is a tubular member with the ends thereof flattened to facilitate fastening to the frame 8. Plates 83 and 84 attached respectively to frame rails 9 and 10 are provided to permit the attaching of the rocker bar 81 to the frame 8.

Disposed between cross bar 80 and rocker bar 81 is a bearing which is illustrated herein as a cylindrically shaped rubber mounting 88. Cross bar 80 and rocker bar 81 are arranged so that rubber mounting 88 is positioned so that the axis of rotation 50 of the front sheet metal unit 20 passes through mounting 88. It is by way of convenience in the particular structure illustrated that mounting 88 is positioned in front of radiator core 60. Mounting 88 could be placed forwardly or rearwardly of its indicated position and the only requirement in accordance with the present invention is that mounting 88 be positioned so that the axis of rotation 50 passes through mounting 88.

As illustrated, mounting 88 comprises a cylindrically shaped rubber member 89 with its axis disposed vertically. Metal disk members 90 and 91 are on opposite sides of and are preferably bonded to the rubber member 89. Disk 90 is attached to rocker bar 81 and disk 91 is attached to cross bar 80 as with fastening means 92.

With the construction described above the front sheet metal unit 20, which includes fenders 21 and 22 and transverse member 23 along with other parts, is mounted so that it can vibrate torsionally about its axis of rotation 50 relative to and substantially independently of the frame 8 and body 11. The axis of rotation 50 of the front sheet metal unit 20 passes through mounting 88 and it will be noted that the only connection between the front of the front sheet metal unit 20 and the front of the frame 8 is through the mounting 88. As described above, the rear ends of the front fenders 21 and 22 are rigidly attached to the cowl 13 but, by reason of the inherent flexibility of the sheet metal, the sheet metal unit 20 has a strong tendency to vibrate torsionally about its axis of rotation 50. This torsional vibration of the front sheet metal unit 20 is not in and by itself objectionable because, in the present invention, it vibrates independently of the frame and has a natural frequency substantially lower than the frequency of the front suspension 31 and resonant conditions are thus avoided.

In the present invention the front sheet metal unit 20 is permitted to vibrate unrestrainedly about its axis of rotation 50 by reason of the bearing or mounting 88 through which said axis extends. Referring to FIG. 5, the parts associated with the front sheet metal unit 20 which vibrate torsionally as a unit relative to the frame 8 and rocker bar 88 are the radiator 27, core support member 68, projecting member 70, apron 28 and cross bar 80. A radiator hose 94, which is connectable to the engine which is mountable on the frame 8, is of a flexible material such as rubber so that vibrations from the sheet metal unit 20 are not transmitted to the frame 8 through the hose 94.

In any particular embodiment of the invention the axis of rotation 50 may be determined experimentally as follows. The rear part of the sheet metal unit 20 is attached to the cowl 13 as described and no connection between the front of sheet metal unit 20 and the front of frame 8 is provided. Forces are then applied to frame 8 which simulate the forces which would be imparted to frame 8 by the front and rear suspensions of the vehicle encountering road conditions. The motion of the sheet metal unit 20 relative to the frame 8 is then observed and it is found that such motion is a torsional vibration about the axis of rotation 50 as described. Upon determining the axis of rotation 50 in this manner the mounting 88 is positioned so that this axis of rotation passes through mounting 88.

The forces imparted to frame 8 by the front and rear suspensions cause the frame rails 9 and 10 to pivot relative to each other in opposite directions about a transverse axis 100 (see FIG. 2) between the ends of the frame 8. This relative pivotal movement between rails 9 and 10 is such that the front and rear ends of rail 9 are up and down respectively while front and rear ends of rail 10 are down and up respectively, and vice versa. This relative pivotal movement between rails 9 and 10 has a natural frequency and it is in accordance with the invention that the natural frequency of the frame be sufficiently different from the natural frequency of the sheet metal unit 20 to avoid resonant conditions.

As indicated in FIG. 2, the axis of rotation 50 of the sheet metal unit 20 extends rearwardly and downwardly and intersects the transverse frame axis 100 about which rails 9 and 10 are pivotal as explained above. As the axis of rotation 50 extends rearwardly of cowl 13, it may be noted that the front end of the body 11, including cowl 13, also has torsional vibration about the axis of rotation 50.

In a particular installation the amplitude of vibration at the outer sides of the fenders 21 and 22 relative to the frame 8, was about one-eighth of an inch. Tuning weights 95 and 96, as seen in FIGS. 1 and 2, were attached to the rear of and on each side of transverse member 23 to adjust the natural frequency of the sheet metal unit 20 to about 9 to 10 cycles per second and this frequency was sufficiently lower than the 12 to 13 cycle per second frequency of the front wheel suspension 31 to avoid resonant conditions.

The natural frequency of the front sheet metal unit 20 is of course affected by items mounted on it such as a battery and by hood 97 which is hinged to cowl 13 but has the weight thereof carried by sheet metal unit 20. In each case, therefore, it is a matter of selecting and properly positioning tuning weights 95 and 96 and doing whatever else is necessary to insure that the natural frequency of the sheet metal unit 20 is substantially different from the natural frequency of the front wheel suspension 31.

An additional advantage of the invention resides in the construction of mounting 88 wherein plates or disks 90 and 91 thereof are in horizontal plane and are in parallel relation on opposite sides of the rubber member 89. With this construction, transversely directed forces from the frame 8 to the sheet metal unit 20 are resiliently absorbed in shear by the rubber member 89 instead of being transmitted directly to the unit 20 and this is a further contribution of the invention to the providing of a smoother riding condition.

The invention may be embodied in other specific forms without departing from the spirit or essential characteristics thereof. The embodiment of the invention described and shown is therefore to be considered in all respects as illustrative and not restrictive, the scope of the invention being indicated by the appended claims rather than by the foregoing description, and all changes which come within the meaning and range of equivalency of the claims are therefore intended to be embraced therein.

It is claimed and desired to secure by Letters Patent:

1. An automobile comprising, a frame unit having a natural frequency of vibration, front suspension means, a body member mounted on said frame unit, a front sheet metal unit including front fenders and transverse means connecting said fenders, said sheet metal unit having a longitudinally extending natural axis of rotation and having the rear end thereof attached to the front end of said body member, bearing means between the front end of said sheet metal unit and the front end of said frame unit aligned with said axis of rotation of said front sheet metal unit to provide for pivotal vibrational movement of said sheet metal unit about said axis, tuning weights attached to one of said units for giving said one of said units a natural frequency of vibration different by a predetermined amount from the natural frequency of said other unit and said suspension means.

2. An automobile comprising, a frame unit having a natural frequency of vibration, front suspension means having a natural frequency of vibration, a body member including a front cowl member mounted on said frame unit, a front sheet metal unit including front fenders and transverse means connecting said fenders, said sheet metal unit having a longitudinally extending natural axis of rotation and having the rear end thereof attached to said cowl member, bearing means between the front end of said sheet metal unit and the front end of said frame unit aligned with said longitudinal axis of rotation of said front sheet metal unit to provide for pivotal vibrational movement of said sheet metal unit about said axis, tuning weights attached to said sheet metal unit for giving said sheet metal unit a natural frequency of vibration different by a predetermined amount from the natural frequency of said frame unit and said front suspension means.

3. An automobile in accordance with claim 2 wherein the natural frequency of said sheet metal unit is lower than the natural frequency of said frame unit.

4. An automobile in accordance with claim 2 wherein the natural frequency of said sheet metal unit is about ten cycles per second and the natural frequency of said front suspension means is about thirteen cycles per second.

5. An automobile comprising, a frame unit having a natural frequency of vibration, front suspension means having a natural frequency of vibration, a body member including a front cowl member mounted on said frame unit, a front sheet metal unit including front fenders and transverse means connecting the front ends of said fenders, said sheet metal unit having a longitudinally extending natural axis of rotation and having the rear end thereof attached to said cowl member, bearing means between the front end of said sheet metal unit and the front end of said frame unit aligned with said longitudinal axis of rotation of said front sheet metal unit to provide for pivotal vibrational movement of said sheet metal unit about said axis, resilient means associated with said bearing means, tuning weights attached to said sheet metal unit for giving said sheet metal unit a natural frequency of vibration different by a predetermined amount from the natural frequency of said front suspension means.

6. An automobile in accordance with claim 5 wherein the natural frequency of said sheet metal unit is lower than the natural frequency of said front suspension means.

7. An automobile in accordance with claim 5 wherein the natural frequency of said sheet metal unit is about ten cycles per second and the natural frequency of said front suspension means is about thirteen cycles per second.

8. An automobile comprising, a frame unit having a natural frequency of vibration, a front suspension means having a natural frequency of vibration, a body member including a front cowl member mounted on said frame unit, a front sheet metal unit including front fenders and transverse means connecting the front ends of said fenders, said transverse means including a grille member extending between said fenders, said sheet metal unit having a longitudinally extending natural axis of rotation and having the rear end thereof attached to said cowl member, a hood and other items including a radiator having at least a portion of their weight carried by said front sheet metal unit, frame bracket means attached to the front end of said frame, front sheet metal unit bracket means attached to the front end of said sheet metal unit, bearing means between said bracket means aligned with said longitudinal axis of rotation of said front sheet metal unit to provide for pivotal movement of said front sheet metal unit about said axis, and tuning weights attached to one of said units for giving said one of said units a natural frequency of vibration different by a predetermined amount from the natural frequency of said other unit and said front suspension means.

9. An automobile comprising, a frame unit having a natural frequency of vibration, front suspension means having a natural frequency of vibration, a body member including a front cowl member mounted on said frame unit, a front sheet metal unit including front fenders and transverse means extending between said fenders, said sheet metal unit having a longitudinally extending natural axis of rotation and having the rear end thereof attached to said cowl member, a hood having at least a portion of the weight thereof carried by said front sheet metal unit, other items including a radiator mounted on and having the weight thereof carried by said sheet metal unit, frame bracket means attached to the front end of said frame, front sheet metal unit bracket means attached to the front end of said sheet metal unit, bearing means between said bracket means aligned with said longitudinal axis of rotation of said front sheet metal unit to provide for pivotal movement of said front sheet metal unit about said axis, resilient means associated with said bearing means for resiliently mounting the front part of said sheet metal unit on said frame, and tuning weights attached to one of said units for giving said one of said units a natural frequency of vibration different by a predetermined amount from the natural frequency of said other unit and said front suspension means.

10. An automobile comprising, a frame unit including two generally parallel longitudinally extending sill members, a body member including a front cowl member mounted on said frame, a front sheet metal unit including front fenders and transverse means extending between and connecting said fenders, said fenders each having an apron member on the inner side thereof and a projecting member on the inner said thereof, said sheet metal unit having a longitudinally extending natural axis of rotation and having the rear end thereof attached to said cowl member, a radiator, a plate member on each side of said radiator for connecting said apron and said projecting member to the radiator on that side of the radiator, a cross bar connected to and extending between said plate members, an inverted V-shaped rocker bar extending between and connected to the sills of said frame member, a mounting including a cylindrically shaped rubber member and metal disks on opposite sides thereof, said mounting being disposed between said cross bar and said rocker bar in alignment with said longitudinal axis of rotation of said sheet metal unit with said disks connected respectively to said cross bar and said rocker bar, and tuning weights attached in opposite sides of said sheet metal unit for giving said sheet metal unit a natural frequency of vibration which is substantially different from the natural frequency of said frame unit.

11. An automobile comprising, a longitudinally extending frame member, an upright support member attached to and positioned between the ends of said frame member, a front sheet metal unit including front fenders and transverse means connecting said fenders, said unit having the rear end thereof attached to said upright support member and as so attached said front sheet metal unit having a longitudinally extending natural axis of rotation about which said unit is oscillatable, a frame bracket attached to the front end of said frame unit, a front sheet metal unit bracket attached to the front end of said sheet metal unit, mounting means attached to and positioned between said brackets for supporting the front end of said front sheet metal unit on said frame, said mounting means being positioned by said brackets at an elevation so as to be intersected by said natural axis of rotation to allow said front sheet metal unit to oscillate about said axis.

12. An automobile in accordance with claim 11 wherein said mounting means comprises bearing means.

13. An automobile in accordance with claim 11 wherein said mounting means comprise a rubber or rubber-like cylindrically shaped member with its axis extending vertically.

References Cited in the file of this patent

UNITED STATES PATENTS

| 2,016,207 | Lindenberg | Oct. 1, 1935 |
| 2,020,597 | Appel | Nov. 12, 1935 |
| 2,022,111 | Evans | Nov. 26, 1935 |
| 2,199,036 | Best | Apr. 30, 1940 |
| 2,564,888 | Foley et al. | Aug. 21, 1951 |
| 2,606,625 | Paton | Aug. 12, 1952 |